(12) United States Patent
Guise et al.

(10) Patent No.: US 12,354,092 B2
(45) Date of Patent: Jul. 8, 2025

(54) ESTABLISHMENT OF A SECURE SESSION BETWEEN A CARD READER AND A MOBILE DEVICE

(71) Applicant: Block, Inc., Oakland, CA (US)

(72) Inventors: Max Joseph Guise, San Francisco, CA (US); Jason Waddle, Alameda, CA (US); Dino Dai Zovi, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/405,467

(22) Filed: Jan. 5, 2024

(65) Prior Publication Data
US 2024/0144259 A1 May 2, 2024

Related U.S. Application Data

(60) Continuation of application No. 17/854,468, filed on Jun. 30, 2022, now Pat. No. 11,893,580, which is a
(Continued)

(51) Int. Cl.
G06Q 20/00 (2012.01)
G06Q 20/20 (2012.01)
(Continued)

(52) U.S. Cl.
CPC ....... *G06Q 20/3829* (2013.01); *G06Q 20/202* (2013.01); *G06Q 20/204* (2013.01);
(Continued)

(58) Field of Classification Search
CPC ............. G06Q 20/3829; G06Q 20/202; G06Q 20/204; G06Q 20/206; G06Q 20/322;
(Continued)

(56) References Cited

U.S. PATENT DOCUMENTS 5,204,902 A 4/1993 Reeds et al.
5,241,599 A 8/1993 Bellovin et al.
(Continued)

FOREIGN PATENT DOCUMENTS

AU 2020210294 A1 8/2020
CA 2766038 A1 * 1/2008 ........... G06K 7/0008
(Continued)

OTHER PUBLICATIONS

Foreign Ref Included (Year: 2011).*
(Continued)

*Primary Examiner* — Dante Ravetti
(74) *Attorney, Agent, or Firm* — IP Spring

(57) ABSTRACT

In some examples, a computer system receives, via a network and from a software module executable on a mobile device coupled to a card reader, security information that includes first security information associated with the card reader and second security information that is based on content of the software module and/or a software environment of the software module. The computer system determines validity of the first security information associated with the card reader based at least on information previously stored in the card reader and also accessible to the computer system. The computer system also determines the validity of the second security information. Based on determining the first and second security information are valid, the computer system sends, to the mobile device, an indication that the computer system has validated the security information, prompting the software module and the card reader to establish a secure communication session with each other.

20 Claims, 9 Drawing Sheets

Related U.S. Application Data division of application No. 15/497,388, filed on Apr. 26, 2017, now Pat. No. 11,379,831, which is a division of application No. 14/614,350, filed on Feb. 4, 2015, now Pat. No. 9,665,867, which is a continuation of application No. 14/273,447, filed on May 8, 2014, now Pat. No. 8,990,121.

(51) Int. Cl.

| | | |
|---|---|---|
| *G06Q 20/32* | (2012.01) | |
| *G06Q 20/34* | (2012.01) | |
| *G06Q 20/38* | (2012.01) | |
| *G06Q 20/40* | (2012.01) | |
| *G07F 7/08* | (2006.01) | |
| *G07G 1/00* | (2006.01) | |
| *G07G 1/14* | (2006.01) | |
| *H04L 9/08* | (2006.01) | |
| *H04L 9/30* | (2006.01) | |

(52) U.S. Cl.
CPC ......... *G06Q 20/206* (2013.01); *G06Q 20/322* (2013.01); *G06Q 20/3226* (2013.01); *G06Q 20/3567* (2013.01); *G06Q 20/4012* (2013.01); *G07F 7/0886* (2013.01); *G07G 1/0009* (2013.01); *G07G 1/0036* (2013.01); *G07G 1/14* (2013.01); *H04L 9/0841* (2013.01); *G06Q 2220/00* (2013.01); *H04L 9/0861* (2013.01); *H04L 9/30* (2013.01)

(58) Field of Classification Search
CPC ........... G06Q 20/3226; G06Q 20/3567; G06Q 20/4012; G06Q 2220/00; G07F 7/0886; G07G 1/0009; G07G 1/0036; G07G 1/14; H04L 9/0841; H04L 9/0861; H04L 9/30
USPC .......................... 705/16, 21, 59; 380/44, 262
See application file for complete search history.

(56) References Cited

U.S. PATENT DOCUMENTS

| | | | |
|---|---|---|---|
| 5,903,652 A | 5/1999 | Mital | |
| 6,148,404 A | 11/2000 | Yatsukawa | |
| 6,772,331 B1 | 8/2004 | Hind et al. | |
| 7,302,564 B2 | 11/2007 | Berlin | |
| 7,788,491 B1 | 8/2010 | Dawson | |
| 7,929,702 B2 | 4/2011 | Brown et al. | |
| 8,127,345 B2 | 2/2012 | Gregg et al. | |
| 8,254,579 B1 | 8/2012 | Morgan et al. | |
| 8,281,998 B2 | 10/2012 | Tang et al. | |
| 8,472,629 B2 | 6/2013 | Hamachi | |
| 8,494,165 B1 | 7/2013 | Monica et al. | |
| 8,788,825 B1 | 7/2014 | Le et al. | |
| 8,874,913 B1 | 10/2014 | Monica et al. | |
| 8,880,881 B2 | 11/2014 | Morel et al. | |
| 8,978,975 B2 | 3/2015 | Barnett | |
| 8,990,121 B1 | 3/2015 | Guise et al. | |
| 9,141,977 B2 | 9/2015 | Davis et al. | |
| 9,665,867 B2 | 5/2017 | Guise et al. | |
| 11,893,580 B2 | 2/2024 | Guise et al. | |
| 2002/0035695 A1 | 3/2002 | Riches et al. | |
| 2002/0188870 A1 | 12/2002 | Gong et al. | |
| 2003/0018878 A1 | 1/2003 | Dorward et al. | |
| 2003/0177353 A1 | 9/2003 | Hiltgen | |
| 2004/0094624 A1 | 5/2004 | Fernandes et al. | |
| 2004/0104268 A1* | 6/2004 | Bailey ................ | G06Q 20/3223 235/439 |
| 2004/0153644 A1 | 8/2004 | McCorkendale et al. | |
| 2006/0083187 A1 | 4/2006 | Dekel | |
| 2006/0224892 A1 | 10/2006 | Brown et al. | |
| 2007/0067643 A1 | 3/2007 | Zhuk et al. | |
| 2007/0141984 A1 | 6/2007 | Kuehnel et al. | |
| 2008/0016537 A1 | 1/2008 | Little et al. | |
| 2008/0017711 A1* | 1/2008 | Adams ................. | H04W 12/08 235/439 |
| 2008/0244714 A1 | 10/2008 | Kulakowski et al. | |
| 2009/0198618 A1 | 8/2009 | Chan et al. | |
| 2010/0017602 A1 | 1/2010 | Bussard et al. | |
| 2010/0260069 A1 | 10/2010 | Sakamoto et al. | |
| 2010/0325735 A1 | 12/2010 | Etchegoyen | |
| 2011/0030040 A1 | 2/2011 | Ronchi et al. | |
| 2011/0035604 A1 | 2/2011 | Habraken | |
| 2012/0124375 A1 | 5/2012 | Truskovsky et al. | |
| 2013/0023240 A1 | 1/2013 | Weiner | |
| 2013/0119130 A1 | 5/2013 | Braams | |
| 2013/0144792 A1 | 6/2013 | Nilsson et al. | |
| 2013/0173475 A1 | 7/2013 | Lund | |
| 2013/0227647 A1 | 8/2013 | Thomas et al. | |
| 2013/0268443 A1 | 10/2013 | Petrov et al. | |
| 2013/0328801 A1 | 12/2013 | Quigley et al. | |
| 2013/0332367 A1 | 12/2013 | Quigley et al. | |
| 2014/0032415 A1 | 1/2014 | Lee et al. | |
| 2014/0075522 A1 | 3/2014 | Paris et al. | |
| 2014/0237545 A1 | 8/2014 | Mylavarapu et al. | |
| 2014/0241523 A1 | 8/2014 | Kobres et al. | |
| 2015/0324792 A1 | 11/2015 | Guise et al. | |
| 2021/0192507 A1 | 6/2021 | Guise et al. | |

FOREIGN PATENT DOCUMENTS

| | | | | |
|---|---|---|---|---|
| CA | 2860757 | A1 | 7/2013 | |
| CA | 2948481 | A1 | 11/2015 | |
| EP | 0 739 105 | B1 | 10/2004 | |
| EP | 3866092 | A1 | 8/2021 | |
| GB | 2491731 | A * | 12/2012 | .............. H04W 4/50 |
| JP | 2002-259866 | A | 9/2002 | |
| JP | 2003-500923 | A | 1/2003 | |
| JP | 2004-153711 | A | 5/2004 | |
| JP | 2006-293747 | A | 10/2006 | |
| JP | 2009-140275 | A | 6/2009 | |
| JP | 2015-201091 | A | 11/2015 | |
| JP | 6313520 | B2 | 4/2018 | |
| JP | 2018-125876 | A | 8/2018 | |
| WO | 2009/107349 | A1 | 9/2009 | |
| WO | 2013/109370 | A2 | 7/2013 | |
| WO | 2015/171939 | A1 | 11/2015 | |

OTHER PUBLICATIONS

Foreign Ref Included (Year: 2014).*
Menezes, A.J., et al., "Handbook of Applied Cyptography, Motivation for Use of Session Keys, Key Transport Based on Public-Key Encryption, Hybrid Key Transport Protocols Using PK Encryption," Handbook of Applied Cryptography, CRC Press, pp. 494, 506, 507, 512, 513, 514 & 559 (Jan. 1, 1997).
"Wi-Fi Certified Wi-Fi Direct," Wi-Fi Alliance, published Oct. 2010, Retrieved from the Internet URL: http://www.wi-fi.org/knowledge-center/white-papers/wi-fi-certified-wi-fi%C2#AEconnect-devices, on Oct. 16, 2012, pp. 1-14.
Toegl et al., "An approach to introducing locality in remote attestation using near field communications",The Journal of Supercomputing, Kluwer Academic Publishers, BO, vol. 55, No. 2, Mar. 19, 2010, pp. 207-227.
Denning, E.D., "Field Encryption and Authentication", Advances in Cryptology: Proceedings of Crypto, pp. 1-17 (1983).
Denning, R.E.D., "Cryptography and Data Security," Purdue University (1982), pp. 1-199 [Part-1].
Denning, R.E.D., "Cryptography and Data Security," Purdue University (1982), pp. 200-209 [Part-2].
Koch, H.S., et al., "The application of cryptography for data base security," AFIPS National Computer Conference, dated Jun. 7-10, 1976, pp. 97-107.
"Security Requirements for Cryptographic Modules," National Institute of Standards and Technology, FIPS Pub 140-1, on Jan. 11, 1994, pp. 1-69.
Schneier B., "Applied Cryptography, Second Edition: Protocols, Algorithms, and Source Code in C (cloth)", published on Jan. 1,

(56) References Cited

OTHER PUBLICATIONS 1996, retreived from URL: https://mrajacse.files.wordpress.com/2012/01/applied-cryptography-2nd-ed-b-schneier.pdf, 1027 pages.

* cited by examiner

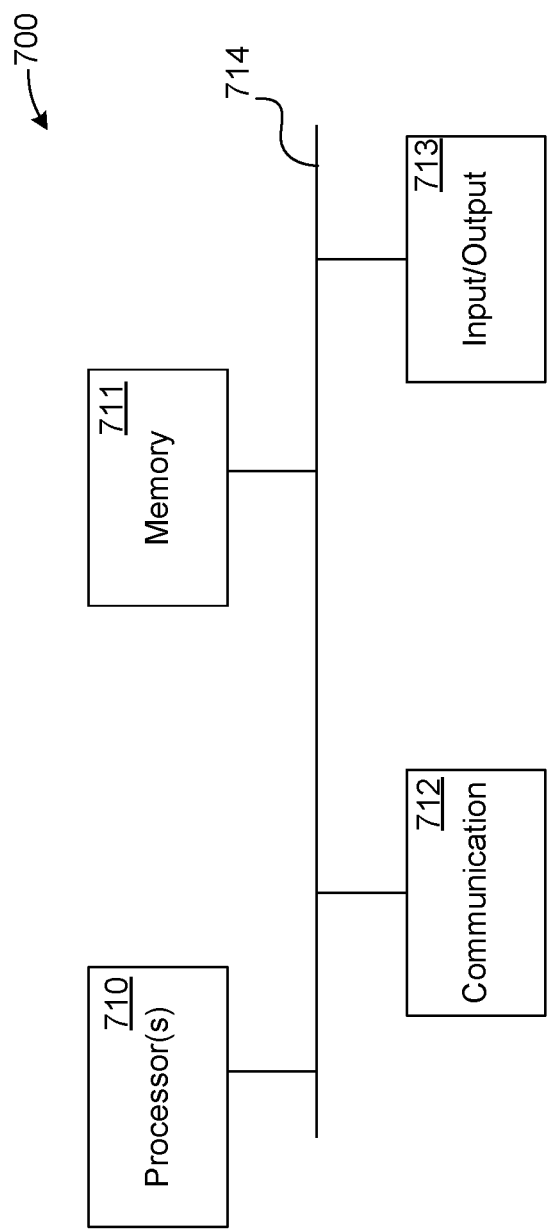

ESTABLISHMENT OF A SECURE SESSION BETWEEN A CARD READER AND A MOBILE DEVICE

CROSS-REFERENCES TO RELATED APPLICATIONS

This application is a continuation of, and claims priority to, U.S. patent application Ser. No. 17/854,468, filed on Jun. 30, 2022, issued as U.S. Pat. No. 11,893,580, which is a continuation of, and claims priority to, U.S. patent application Ser. No. 15/497,388, filed on Apr. 26, 2017, issued as U.S. Pat. No. 11,379,831, which is a divisional application of, and claims priority to, U.S. patent application Ser. No. 14/614,350, filed on Feb. 4, 2015, issued as U.S. Pat. No. 9,665,867, which is a continuation of, and claims priority to, U.S. patent application Ser. No. 14/273,447, filed on May 8, 2014, issued as U.S. Pat. No. 8,990,121, and all of which are incorporated by reference herein.

FIELD OF THE INVENTION

At least one embodiment of the present invention pertains to establishment of a secure session in a payment processing system, and more particularly, to the establishment of a secure session between a card reader and a mobile device in a mobile payment processing system.

BACKGROUND

Technology has developed to the point where a merchant can now initiate a credit card transaction with a customer by using a mobile device, such as a smartphone or a tablet computer (e.g., an Apple iPad or the like). For example, current technology includes a small card reader that plugs into the audio jack of a smartphone or tablet of a merchant, and point-of-sale (POS) software that executes in the mobile device, to facilitate a credit card payment transaction. The merchant swipes the customer's credit card through the card reader, and the card reader communicates the card's data to the POS software in the mobile device. The POS software then confirms the authenticity of the card and communicates with a remote financial transaction processing system to obtain authorization for the transaction.

While this type of payment model offers much greater convenience and ease of use than the traditional POS systems, there are certain security related issues that need to be addressed. For example, data read from the card needs to be protected from discovery by unauthorized parties or entities, such as malware that may exist in the mobile device. Additionally, the customer may be required to input a personal identification number (PIN) into the mobile device as a security measure, before data from his or her credit card can be read by the card reader or decrypted by the POS software. PINs are required, for example, in debit card-based transactions and in some credit card-based transactions, such as those associated with the Europay, MasterCard and Visa (EMV) standard. In those scenarios, the PIN also needs to be protected from discovery by unauthorized parties or entities.

BRIEF DESCRIPTION OF THE DRAWINGS

One or more embodiments of the present invention are illustrated by way of example and not limitation in the figures of the accompanying drawings, in which like references indicate similar elements.

FIG. 7 is a high-level block diagram of a hardware architecture of a processing system that can be used to implement a validation system or a mobile device.

DETAILED DESCRIPTION

Figure 1:
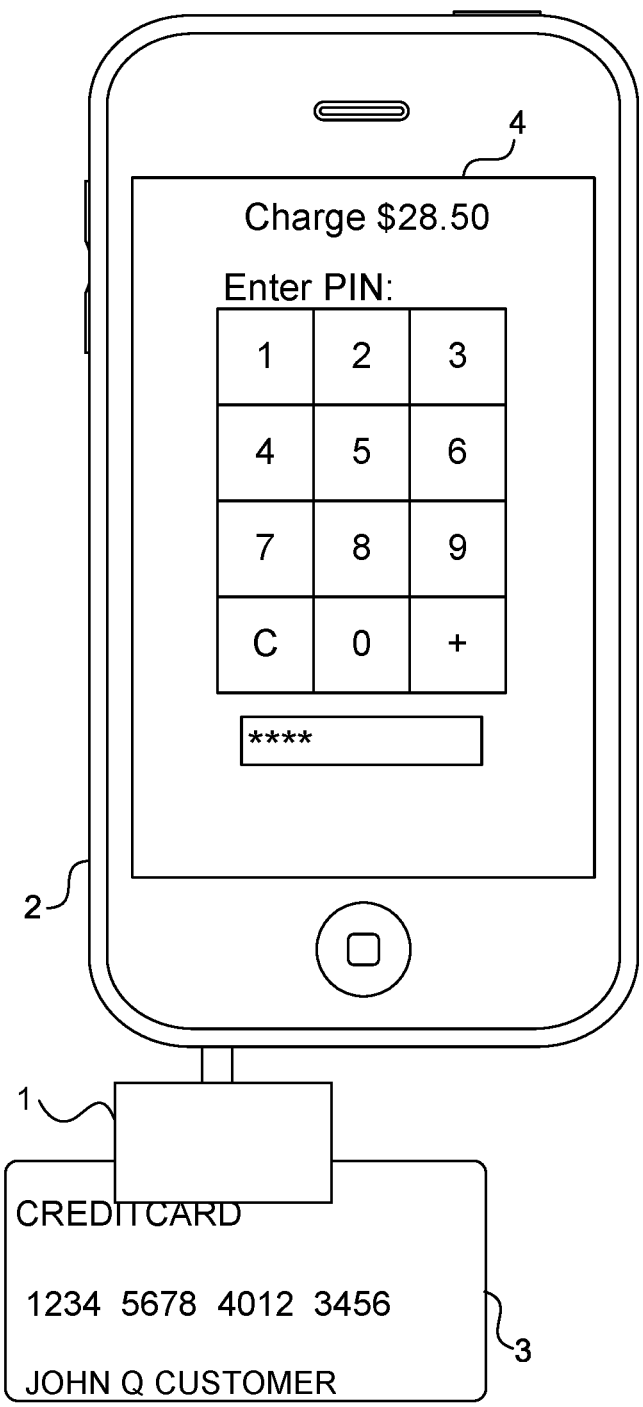
FIG. 1 illustrates an example of a configuration in which a card reader is coupled to a mobile device.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

In a payment transaction involving a card reader connected to a mobile device, confidential or sensitive data may be communicated between the card reader and the mobile device. For example, a customer may input his PIN into the mobile device, and that PIN may be communicated from the mobile device to the card reader to enable the card reader to access other confidential or sensitive data stored on the card, such as the credit card number, expiration date and card verification value (CW). It is desirable, therefore, to protect the customer's PIN and card data from disclosure to unauthorized parties or entities. Such protection can be provided by, among other things, establishing a secure (e.g., encrypted) communication session between the card reader and the mobile device. However, a secure communication session should only be established if it first has been verified that both the card reader and the mobile device are trustworthy, i.e., that they have not been affected by malware or other malicious activity.

Accordingly, introduced here is a technique for establishing a secure communication session between a mobile device and a card reader. The technique in some embodiments involves using a trusted, remote validation system to validate security information of both the card reader and a POS module in the mobile device prior to, and as a precondition of, the card reader and the POS module establishing a secure communication session with each other. The POS module may be software, such as a POS application, as henceforth assumed in this description to facilitate explanation. Note, however, that the POS module could alternatively be dedicated hardware, such as an integrated circuit (IC) chip or chipset in the mobile device, or it could be a combination of software and dedicated hardware.

In certain embodiments of the technique introduced here, the POS module sends the security information of both the card reader and the POS module to a remote validation server. The security information can include cryptographic keys of the POS module and the card reader and additional security information related to the POS module and its software environment. Note that the term "send" or sends" as used herein means that the information is communicated either directly or directly between the sending entity and the receiving entity. In other words, the sending entity sends or transmits the information for delivery to (i.e., destined for) the receiving entity, although one or more intermediary entities may be present in the communication path between the sending entity and the receiving entity.

In certain embodiments, the card reader and the POS application each generate a separate public cryptographic key (hereinafter simply "public key"), both of which the POS application may send to the remote validation server. The POS application also gathers and/or generates additional security information, which can include a "fingerprint" of a software environment in the mobile device, which the POS application also sends to the validation server. The validation server then validates all of that security information. Note that "validation" of an entity, as the term is used herein, includes authentication of the entity (i.e., determining that the entity is who/what it claims to be) or determining that the entity has not been subject to a security breach, or both. In certain embodiments, the validation server analyzes the additional security information of the POS application for evidence of possible "jailbreaking" of the mobile device (i.e., unauthorized enablement of features or functions or disablement of security features), operation of a debugger on the mobile device, the presence of unauthorized software within the mobile device, or unauthorized modification of the POS application itself.

If the validation server determines that all of the security related information is valid (i.e., not indicative of any security breach), the validation server signs the public key of the POS application with its digital signature and sends the signed public key back to the mobile device. The POS application in the mobile device then forwards its public key, signed by the validation server, to the card reader.

Upon receiving the server-signed public key of the POS application, the card reader knows that the POS application can be trusted and, therefore, that a secure communication session can be established with the POS application. Likewise, the POS application at this point also knows that the card reader can be trusted. Accordingly, in that event the card reader and the POS application proceed to establish a secure communication session each other. Establishment of the secure communication session may involve the card reader and the mobile device each generating a symmetric secure session key, which they then use to encrypt and decrypt data communicated between them, such as customer PINs and card data.

Note that while the example of a credit card is used throughout this description for purposes of explanation, the technique introduced here can also be applied to systems and devices that read other types of payment cards, such as debit cards, automated teller machine (ATM) cards, prepaid gift cards, etc. Likewise, the technique introduced here is not limited to systems that handle payment transactions; for example, the technique could be applied to systems and devices that read other types of cards carrying confidential or sensitive information, such as a driver's license, identity card, security access card, etc. Additionally, the term "sale", such as in "point-of-sale" (POS) refers to any type of payment-oriented transaction, including lease, rental or payment for services, for example, and is not limited to an actual purchase or transfer of ownership.

Figure 2:
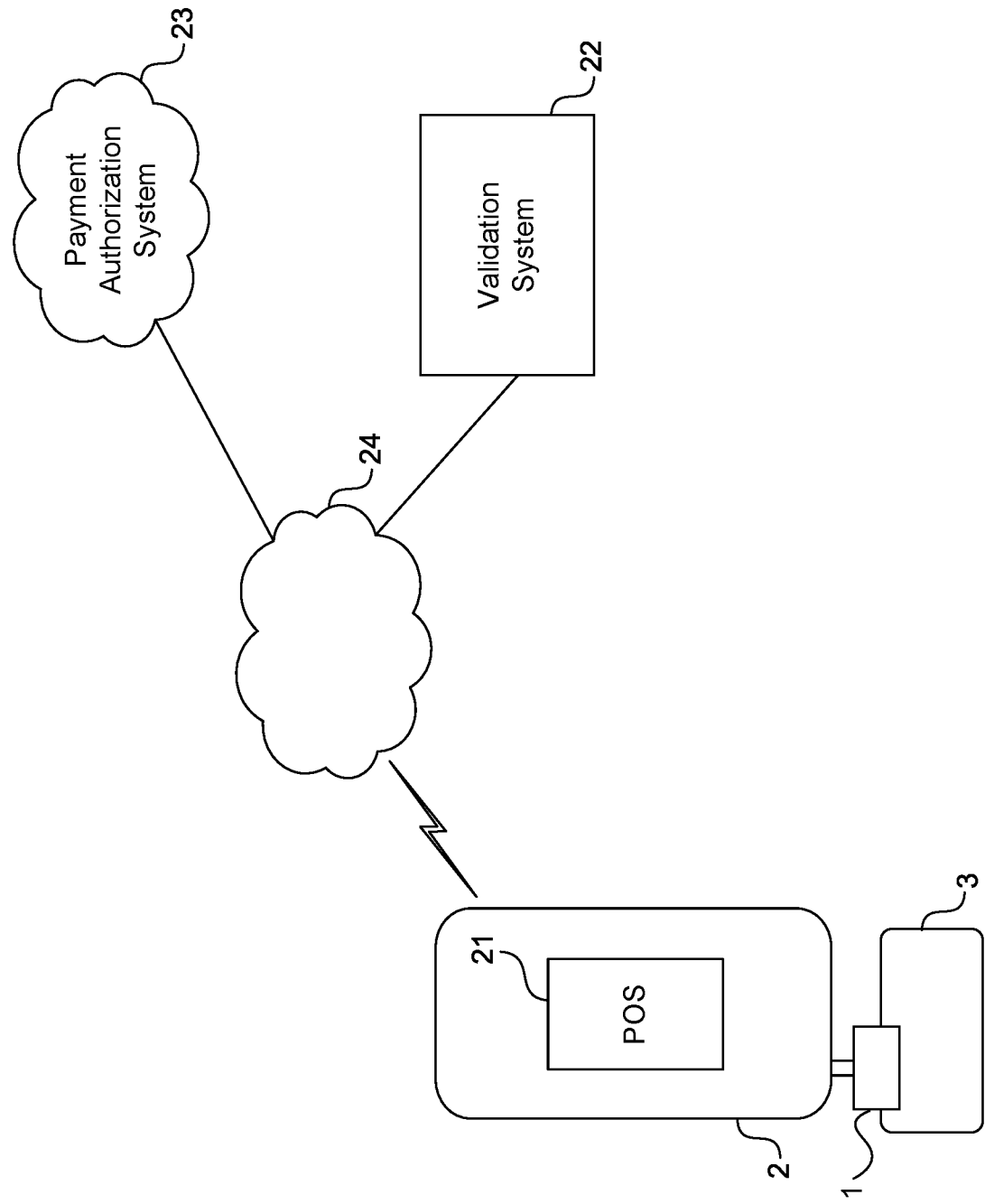
FIG. 2 shows a network environment in which a card reader coupled to a mobile device can operate to perform validation and a payment transaction.

Refer now to FIGS. 1 and 2. FIG. 1 illustrates an example of a configuration in which a card reader is coupled to a mobile device (which in the illustrated example is a smartphone) belonging to merchant, to facilitate transactions with payment cards (e.g., credit cards, debit cards, etc.). FIG. 2 shows a network environment in which these devices can operate. The card reader 1 can plug into a standard connector of the mobile device 2, such as its audio jack or micro-USB port. A payment card 3 and can be read by swiping the card 3 through the card reader 1. The term "swipe" as used herein refers to any manner of triggering a card reader to read data from a card, such as by passing a card into or through a magnetic stripe card reader, optical scanner, smartcard (card with an embedded IC chip) reader, radio frequency identification (RFID) reader, or the like.

When a new payment transaction is to be initiated, the merchant provides an input to a user interface of the mobile device 2 to indicate that fact. In response, a POS application 21 (FIG. 2) executing in the mobile device 2 and causes a display of the mobile device 2 to display a screen 4 to enable initiation of the transaction. In certain implementations, before data is read from the card 3, the merchant is prompted by the user interface to have the customer enter his or her PIN, as shown. The user can do so by typing the PIN on a touchscreen display of the mobile device 2. The POS application 21 then communicates the PIN to the card reader 1, which uses the PIN to "unlock" the customer's card in order to read (or decrypt) data from the card 3. Once the card data has been read from the card 3, it is passed by the card reader 1 to the POS application 21, which then forwards the card data along with information about the transaction information (e.g., transaction amount, date and time, and merchant identification) to a remote payment authorization system 23 to request authorization of the payment. Details of the payment authorization system 23 are not germane to the technique being introduced here. Note, however, that the payment authorization system 23 may include multiple business entities and multiple computers and/or other devices. For example, the payment authorization system 23 may include one or more banks and/or other financial institutions, including a card issuer, an acquirer, a credit card network (e.g., VISA or MASTERCARD), etc.

As indicated above, it is desirable to protect the confidentiality of the user's PIN and card data. Therefore, the technique introduced here enables a secure session to be established between the card reader 1 and the POS application 21 only after both the card reader 1 and the POS application 21 have been validated by a separate, trusted validation system. In certain embodiments, the validation is performed, at least in part, by a remote validation system 22, which is or includes one or more server computers coupled via a network 24 to the mobile device 2, as shown in FIG. 2. The network 24 can be a combination of two or more networks, which may be different types of networks. For example, in the illustrated embodiment the network 24 would include a wireless portion and a wired portion. The wireless portion can be or include, for example, a cellular telecommunications network, a WiFi/IEEE 802.11 compatible network, a Bluetooth connection, or the like, or a combination of such networks/connections. The wired portion can be or include, for example, the Internet, a Metropolitan Area Network (MAN), a corporate Wide Area Network (WAN), a wired local area network (LAN), or the like, or a combination of such networks.

Figure 3:
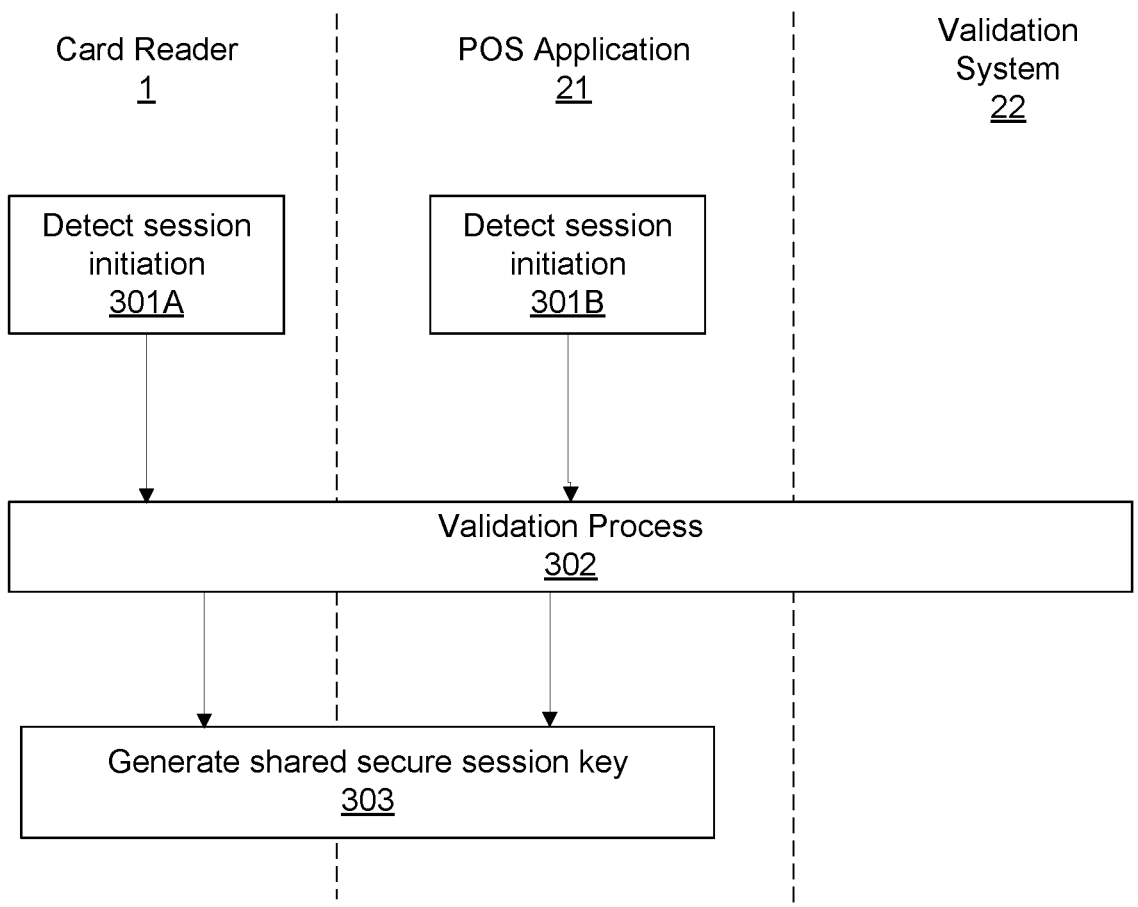
FIG. 3 illustrates an example of a process of establishing a secure session between a card reader and a point-of-sale (POS) application in a mobile device.

FIG. 3 illustrates an example of a process of establishing a secure session between the card reader 1 and the POS application 21, according to certain embodiments of the technique introduced here. As shown, the card reader 1 and the POS application 21 independently detect that a card reader session has been initiated (steps 301A and 301B); for example, they each independently detect that the card reader 1 has been connected to the mobile device 2. In response to that detection, the card reader 1, the POS application 21 and the validation system 22 jointly execute the validation process 302. If the validation process 302 completes successfully, the card reader 1 and the POS application 21 then jointly establish a secure communication session with each other (step 303), by generating a shared secure session key (encryption key). The card reader 1 and the POS application 21 subsequently use the shared secure session key for communication of encrypted data (e.g., PIN and card data) with each other. In certain embodiments, the card reader 2 and the POS application 21 use the Diffie-Hellman technique to generate the shared secure session key.

Figure 4:
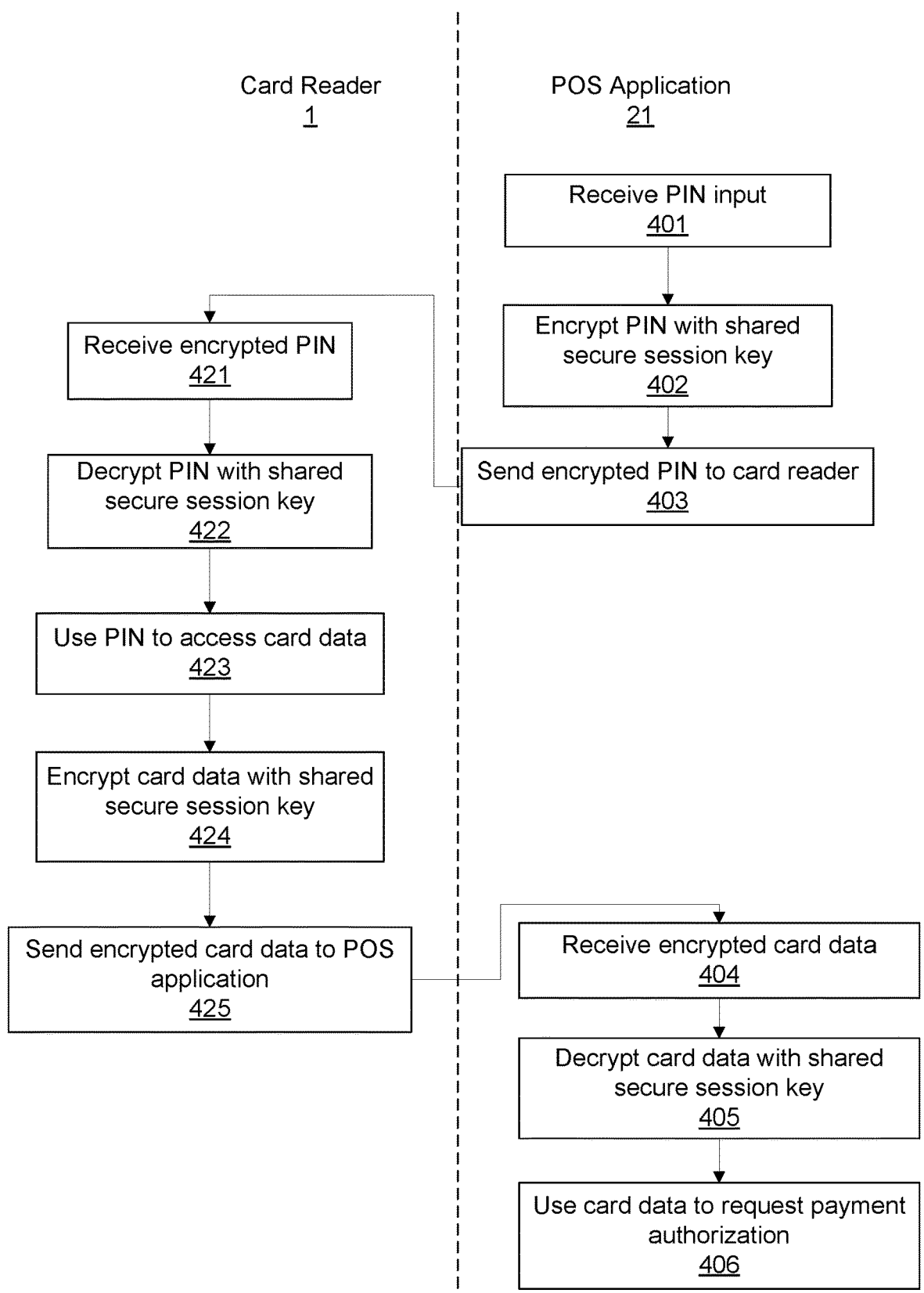
FIG. 4 shows a process by which data can be communicated between a POS application and a card reader to request authorization for a payment transaction.

FIG. 4 shows a process by which data can be communicated between the POS application 21 and the card reader 1 to request authorization for a payment transaction, after a secure session has been established between them. Initially the POS application 21 receives a PIN input by the customer on the mobile device 2 of the merchant (step 401). The POS application 21 then encrypts the PIN (step 402) with the shared secure session key that was established immediately following the validation process 302, and then sends the encrypted PIN to the card reader 1. The card reader 1 receives the encrypted PIN (step 421), decrypts the PIN with its copy of the shared secure session key (step 422), and then uses the PIN to access the card data stored on the customer's card 3 (e.g., card number, expiration date, and CW) (step 423).

The card reader 1 then encrypts the card data using the shared secure session key (step 424) and sends the encrypted card data to the POS application 21 (step 425). The POS application 21 receives the encrypted card data from the card reader 1 (step 404), decrypts the card data with its copy of the shared secure session key (step 405), and then uses the card data to request authorization for the transaction (step 406) by sending an authorization request message containing the card data and transaction data to the payment authorization system 23).

The validation process 302 (FIG. 3) will now be described in greater detail with reference to FIGS. 5, 6A and 6B, according to at least one embodiment. Initially, the card reader 1 detects that it has been connected to the mobile device 2 (step 601), and concurrently with that action the POS application 21 detects that the mobile device 2 has been connected to the card reader 1 (step 621). Any known or convenient technique for detecting a connection between two devices can be used here. Next, the card reader 1 generates a public cryptographic key, $Pub_{Reader}$ 50 (step 602). In certain embodiments, the card reader's public-key $Pub_{Reader}$ 50 is generated based on a key tree 51 that has been stored in a nonvolatile memory 52 in the card reader 2 by the manufacturer of the card reader. The card reader 2 then signs its public key $Pub_{Reader}$ 50 with a digital signature uniquely associated with the card reader 1 (step 603).

Concurrently with the two aforementioned steps (602 and 603), the POS application 21 generates its own public cryptographic key, $Pub_{POS}$ 54 (step 622). Additionally, the POS application 21 generates additional security data, $Data_{POS}$ 55 (step 623). The additional security data $Data_{POS}$ 55 includes information about the POS application itself and may also include information about the sandbox environment 56 in which it operates in the mobile device 2 (e.g., the operating system and/or other software in the mobile device 2). The validation system 22 subsequently uses this additional security data $Data_{POS}$ 55 to determine whether the POS application 21 has been subject to a security breach, as discussed below (steps 644, 645).

The reason for the generation and use of additional security data $Data_{POS}$ 55 is that, in at least some implementations, the POS application 21 may be viewed as less trustworthy than the card reader 1. For example, the card reader 1 by its nature does not need to be programmable or configurable by the end user. Indeed, for security reasons it may be desirable that the card reader 1 not be programmable or configurable at all once it leaves the factory. Accordingly, the card reader 1 may be designed with no post-manufacture programmability or configurability and with very robust tamper protection. In contrast, the mobile device 2 (which may be a smartphone or tablet, for example) is designed to be highly programmable and configurable by the end user. Therefore, the mobile device 2 and the POS application 21 within it may be considered to be more vulnerable to malware and jailbreaking than the card reader 1. Additionally, the manufacturer of the card reader 1 may be the same entity as, or may be affiliated with, the entity that operates the validation system 22, which can facilitate validation of the card reader 1 as discussed below.

Referring again to FIGS. 5, 6A and 6B, after the card reader 1 generates and signs its public key $Pub_{Reader}$ 50 (steps 602 and 603), it sends its signed public key $Pub_{Reader}$ 50A to the POS application 21 (via the physical connection between the card reader 1 and the mobile device 2) (step 604). The POS application 21, after generating its own public key 54 and additional security data $Data_{POS}$ 55, waits to receive the signed public key $Pub_{Reader}$ 50 of the card reader 1 (step 624). After receiving the signed public key $Pub_{Reader}$ 50 of the card reader 1 (step 625), the POS application 21sends these three data sets (or more precisely, causes the mobile device 2 to send them) to the remote validation system 22 (step 626). In certain embodiments, before sending these data sets to the remote validation system 22, the POS application 21 also authenticates and/or digitally signs its own public key $Pub_{POS}$ 54 and/or the additional security data $Data_{POS}$ 55. For example, in one embodiment the POS application 21 authenticates its public key $Pub_{POS}$ 54 and the additional security data $Data_{POS}$ 55 by using a symmetric cryptographic operation (in contrast with digital signing, which is an asymmetric operation); this authentication operation may encapsulate the POS application's public key $Pub_{POS}$ 54 and the additional security data $Data_{POS}$ 55 within a common container, as represented by the dashed box in FIG. 5. In other embodiments, the POS application 21 might instead authenticate its public key $Pub_{POS}$ 54 but not the additional security data $Data_{POS}$ 55, or might digitally sign its public key $Pub_{POS}$ 54 but not the additional security data $Data_{POS}$ 55, or might digitally sign its public key $Pub_{POS}$ 54 and the additional security data $Data_{POS}$ 55.

All of the aforementioned data may be transmitted by the mobile device 2 over a standard cellular communications network (e.g., 3G or LTE/4G network) and then subsequently routed to the validation system 22 via the Internet, for example. In other embodiments, different types of networks and connections may be used to convey this information from the mobile device to the validation system 22, such as a WiFi network, Bluetooth or Bluetooth Low Energy (BLE) connection, etc.

The validation system 22 receives these data items (step 641) and then checks the digital signature of the signed public key $Pub_{Reader}$ 50 of the card reader 1 (step 642). It can be assumed that the validation system 22 stores information in its internal memory to allow it to determine the validity of the digital signature of the card reader 1. In certain embodiments, the manufacturer of the card reader 1 is the entity that operates the validation system 22 and may also be the manufacturer of the POS application 21. This scenario facilitates the determination of whether the received security information is valid. For example, the manufacturer may have stored the key tree 51 and digital signature information in the card reader 1 at the time of manufacture and may also have stored that information in (or made it otherwise accessible to) the validation system 22.

If the validation system 22 determines (step 643) that the signature is not valid, it is assumed that the card reader 1 has been subject to a security breach. In that event, the authentication server causes a validation failure message to be sent to the POS module (step 649) (e.g., via the reverse route mentioned above), which then causes an appropriate error message to be output by the mobile device 2 (step 628). In that case, the validation process terminates, such that a secure session is not permitted to be established between the card reader 1 and the POS module. In more practical terms, in that event that particular card reader cannot be used with that particular mobile device. Additionally, the validation system 22 can maintain knowledge of this failure, such that the card reader 1 can be prevented from being used with any other, even if a subsequent attempt with another mobile device includes a valid signature of the card reader's public key $Pub_{Reader}$ 50.

If the validation system 22 determines (step 643) that the signature of the card reader 1 is valid, the validation system 22 proceeds to analyze the additional security data $Data_{POS}$ 55 provided by the POS application 21 (step 644) to check for any indication of a security breach of the POS application 21 (or other software in the mobile device).

The additional security data $Data_{POS}$ 55 includes information about the POS application 21 and may also include information about the sandbox environment 56 in which the POS application 21 operates. Therefore, the validation system 22 can use the additional security data $Data_{POS}$ 55 to determine whether the POS application 21 has been subject to a security breach. In some embodiments, the additional security data $Data_{POS}$ 55 is or includes a "fingerprint" of the POS application 21. The fingerprint can also be based on the sandbox (software) environment 56 in which the POS application 21 operates. The fingerprint can be, for example, a checksum, a result of a cyclic redundancy check (CRC) function, a result of a cryptographic hash function, or a sampling of the POS application and/or its sandbox environment 56.

The validation system 22 can determine the validity of the fingerprint by comparing it to one or more stored fingerprints. For example, the validation system 22 may compare the received fingerprint to a stored fingerprint previously generated from a separate copy of the POS application (of the same version as the POS application 21 in the mobile device 2) that is known not to have been subject to tampering. Obtaining such a copy would be particularly simple if, for example, the manufacturer of the POS application 21 is also the entity that operates the validation system 22 or is affiliated with that entity.

Additionally or alternatively, the validation system 22 may use one or more "crowd-sourced" fingerprints to check the fingerprint from the mobile device 2. For example, the validation system 22 can store fingerprints that have been received from other user devices and can compare the fingerprint received from the mobile device 2 to the set of stored fingerprints. The stored fingerprints can include fingerprints associated with the POS application and sandbox environment received from other user devices that are executing various operating systems. For example, the stored fingerprints might include fingerprints received from each of various different combinations of a particular smartphone model running a particular version of a particular mobile operating system and a corresponding particular version of the POS application (e.g., a Samsung Galaxy phone executing a first version of the Android operating system and a version of the POS application associated with the first version of the Android operating system; a second Samsung Galaxy phone executing a second version of the Android operating system and a version of the software application associated with the second version of the Android operating system; etc.).

In one embodiment, the validation system 22 stores an association (e.g., in a relational database) between an identification code for each user device and the fingerprint received from that mobile device. The validation system 22 can compute a relative frequency for any particular fingerprint, e.g., the number or percentage of user devices that have a fingerprint that is identical to the particular fingerprint. Since the fingerprints are generated based on the content of the sandboxed environment, fingerprints generated from user devices that are the same and are executing the same operating system and the same version of the POS application should match (e.g., fingerprints should be similar or identical). For example, if two user devices are both iPhones and are executing the same version of the iOS operating system and the same version of the POS application, then the fingerprints associated with the two user devices should be identical. Since compromised devices represent a very small (or zero) percentage of the total number of devices, the fingerprints associated with normally operating devices should have a significantly higher relative frequency.

Therefore, when the validation system 22 receives a fingerprint from the mobile device 2, the validation system 22 can compare the received fingerprint with its set of stored fingerprints to detect any anomalies. For example, the validation system 22 can determine the relative frequency of the received fingerprint compared to fingerprints received across mobile devices from an install base (e.g., across user devices that are the same and executing the same operating system and version of the POS application), and compare the relative frequency to a threshold value. If the relative frequency is above the threshold value, then the validation system 22 can determine that the received fingerprint is valid. If the relative frequency is below the threshold value, then the validation system 22 can determine that the fingerprint is invalid. The predetermined threshold can be based on the number of stored fingerprints, for example.

In certain embodiments, the step (644) of analyzing the additional security data $Data_{POS}$ 55 includes checking for evidence of any one or more of the following types of security breaches: 1) jailbreaking of the mobile device; 2) operation of a debugger on the mobile device; 3) presence of unauthorized software within the mobile device; or unauthorized modification of the POS application 21. In some embodiments, the validation system's analysis of the additional security data (step 644) may primarily or entirely look for evidence of security breaches that have occurred within the sandbox environment 56. However, the analysis may also be able to detect certain types of security breaches that have occurred outside of the sandbox environment 56 within the mobile device 2. For example, the validation system 22 knows that the POS application 21 operates in a sandbox environment 56; consequently, if the analysis of the additional security data Data$_{POS}$ 55 indicates that the POS application 21 has permissions inconsistent with the existence of a sandbox, that may be interpreted as evidence of jailbreaking.

Additionally, the POS application 21 normally will have limited visibility of anything outside of the sandbox environment 56. However, the operating system of a typical mobile device can make certain global changes that affect all applications running in the mobile device, and such changes are therefore visible to the POS application 21. In most embodiments there will be relatively few data items that the POS application 21 can read outside of the sandbox environment 56, and even fewer data items that the POS application 21 should be able to write outside of the sandbox environment 56. Therefore, if analysis of the additional security data Data$_{POS}$ 55 indicates that the POS application 21 can write data outside of the sandbox environment 56 in an unexpected way, that also may be interpreted as evidence of a security breach.

Figure 5:
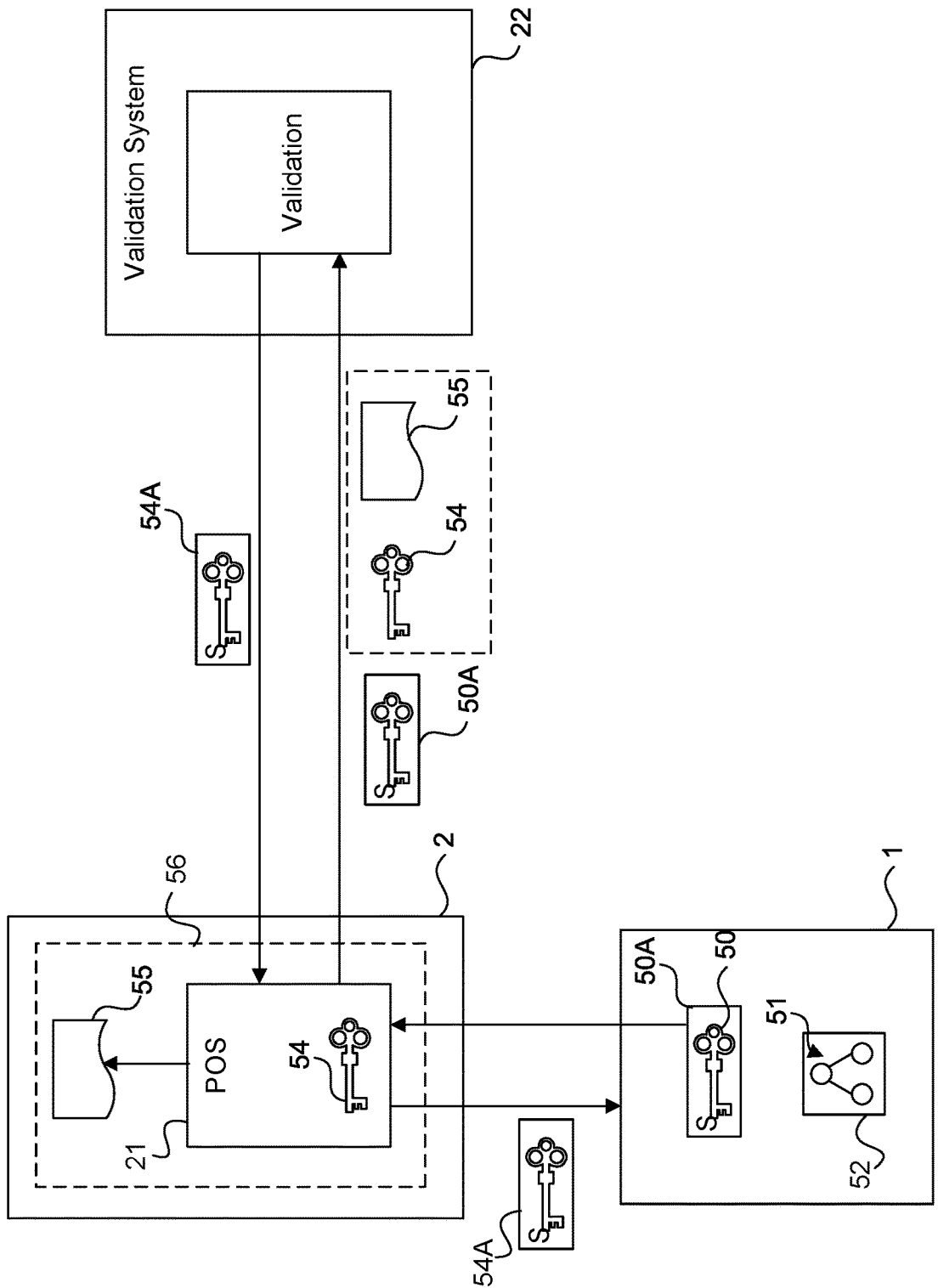
FIG. 5 schematically shows an example of a process of validating a card reader and a POS application for secure session establishment.
Figure 6A:
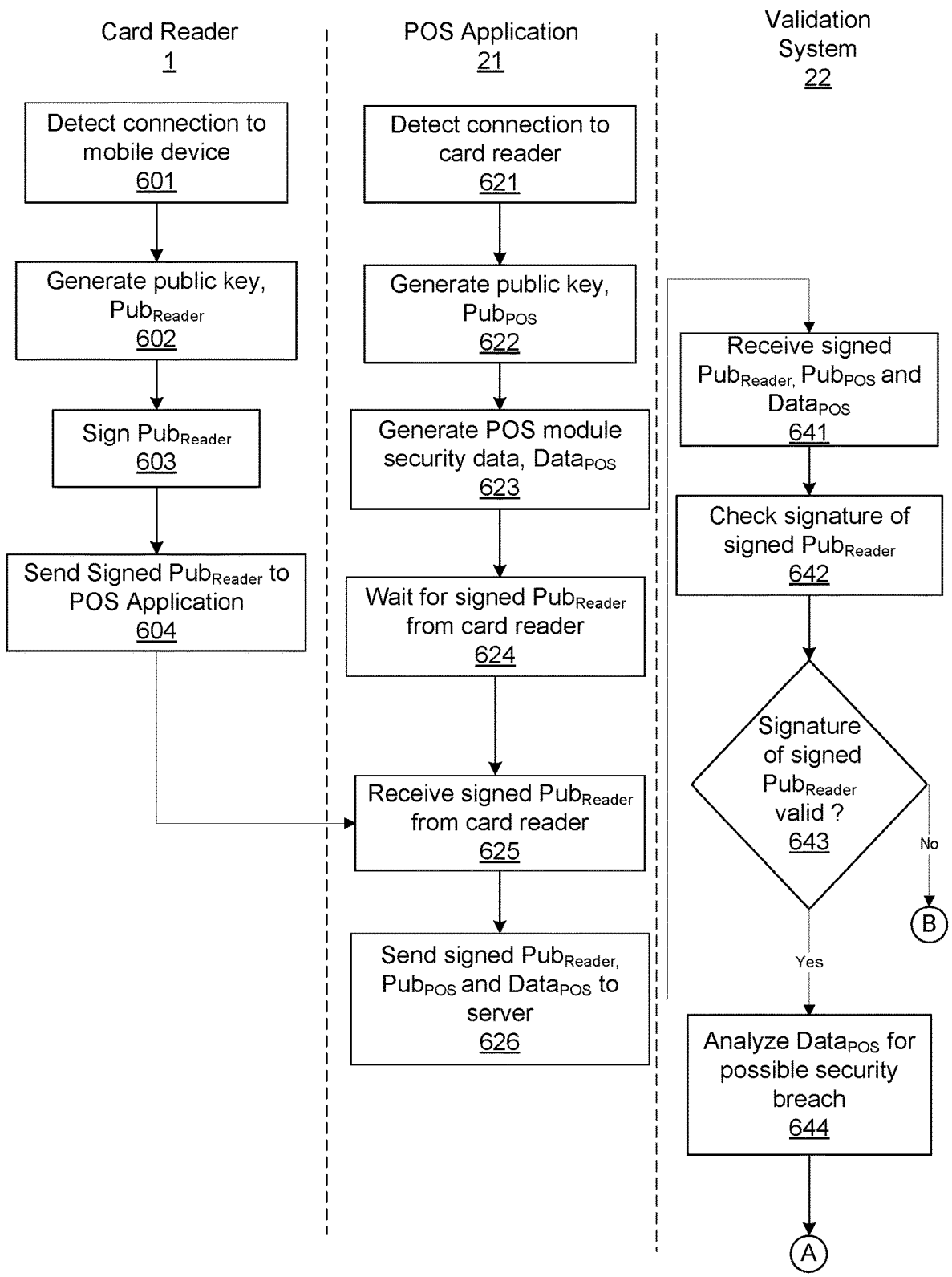
FIGS. 6A and 6B together are a flow diagram illustrating an example of a process of validating a card reader and a POS application for secure session establishment.
Figure 6B:
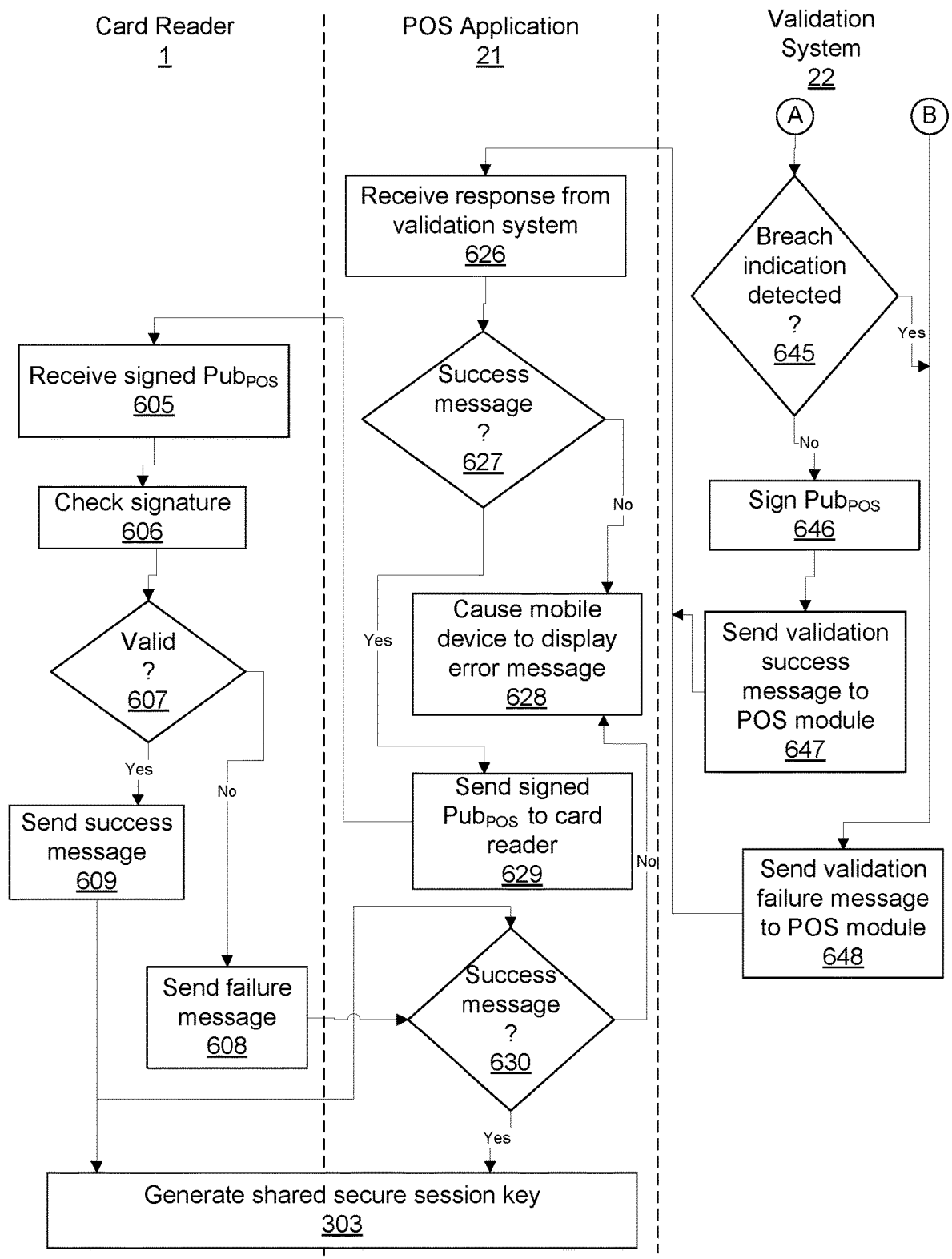

Referring still to FIGS. 5, 6A and 6B, if the validation system 22 detects any indication of a security breach from the additional security data Data$_{POS}$ 55 (step 645), the validation system 22 sends a validation failure messages to the POS application 21 (step 648). As noted above, this action in effect precludes establishment of a secure session between the card reader 1 and the POS application 21. In this event, the validation system 22 can maintain knowledge that the POS application 21 is suspect.

If the validation system 22 detects no indication of a security breach in the additional security data (step 645), it digitally signs the public key Pub$_{POS}$ 54 of the POS application 21 (step 646) and sends that signed public key Pub$_{POS}$ 54A in a validation success message to the POS application 21 (step 647). In some embodiments (not shown), the validation system 22 also authenticates (e.g., using a symmetric cryptographic operation) and/or digitally signs the public key Pub$_{Reader}$ 50 of the card reader and sends that to the POS application 21 in step 647.

The POS application 21 receives the validation system 22's response (step 626). If that response is a validation failure message, then as noted above, the POS application 21 causes an error message to be displayed on the mobile device 2 (step 628), and the process terminates. On the other hand, if the response from the validation system 22 is a validation success message, the POS application 21 extracts its own public key Pub$_{POS}$ 54A signed by the validation system 22, and sends its signed public key Pub$_{POS}$ 54A to the card reader 1 (step 629). The card reader 1 receives that signed key Pub$_{POS}$ 54A (step 605) and checks the digital signature of the validation system 22 (step 606). It can be assumed that the card reader 1 stores information in its internal memory to allow it to determine the validity of the digital signature of the validation system 22. In certain embodiments, the manufacturer of the card reader 1 is also the entity that operates the validation system 22, and may also be the manufacturer of the POS application 21, as noted above.

If the card reader 1 determines (step 607) that the digital signature of the validation system 22 is not valid, it sends a validation failure message to the POS application 21 (step 608). If, on the other hand, the card reader 1 determines that the digital signature of the validation system 22 is valid, it sends a validation success message to the POS application 21 (step 609). The card reader 1 then cooperates with the POS application 21 to generate a secure session key, as mentioned above (step 303; see also FIG. 3). In certain embodiments, the secure session key is a symmetric encryption key that is shared by the card reader 1 and the POS application 21, i.e., the same secure session key value is computed separately by the card reader 1 and the POS application 21, based on a sequence of communications between them. In certain embodiments, the card reader 1 and the POS application 21 use the Diffie-Hellman technique to generate the shared secure session key.

Hence, the POS application 21 receives the validation failure or success message (as the case may be) from the card reader 1 and, if it was a validation failure message, causes the mobile device 2 to output an error message to the user (step 628). If, however, the message was a validation success message (step 630), the POS application 21 cooperates with the card reader 1 as explained above to generate the shared secure session key (step 303).

FIG. 7 illustrates at a high-level an example of the hardware architecture of a processing system that can be used to implement the validation system 22 or the mobile device 2 (although the implementation would be different for either case). Note that the validation system 22 can comprise multiple instances of the architecture shown in FIG. 7 (i.e., multiple computers), which may be coupled to each other via a network or multiple networks. Furthermore, the computer system that implements the validation system 22 may perform functions other than validation.

In the illustrated embodiment, the architecture 700 includes one or more processors 710, memory 711, one or more communication device(s) 712, and one or more input/output (I/O) devices 713, all coupled to each other through an interconnect 714. The interconnect 714 may be or include one or more conductive traces, buses, point-to-point connections, controllers, adapters and/or other conventional connection devices. The processor(s) 710 may be or include, for example, one or more general-purpose programmable microprocessors, microcontrollers, application specific integrated circuits (ASICs), programmable gate arrays, or the like, or a combination of such devices. The processor(s) 710 control the overall operation of the processing device 700.

Memory 711 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 711 may store data and instructions that configure the processor(s) 710 to execute operations in accordance with the techniques described above. The communication devices 712 may be or include, for example, an Ethernet adapter, cable modem, Wi-Fi adapter, cellular transceiver, Bluetooth or BLE transceiver, or the like, or a combination thereof. Depending on the specific nature and purpose of the processing device 700, the I/O devices 713 can include devices such as a display (which may be a touch screen display), audio speaker, keyboard, mouse or other pointing device, microphone, camera, etc.

In the case of the mobile device 2, the communication devices 712 can be or include, for example, a cellular telecommunications transceiver (e.g., 3G or 4G/LTE), Wi-Fi transceiver, Bluetooth or BLE transceiver, or the like, or a combination thereof. In the case of the validation system 22, the communication devices 712 can be or include, for example, any of the aforementioned types of communication devices, a wired Ethernet adapter, cable modem, DSL modem, or the like, or a combination of such devices. Additionally, the mobile device 2 includes a connector (not shown) to connect to the card reader 1 as described above. The connector can be, for example, a standard audio jack, micro-USB connector, or any other known or convenient type of connector.

Figure 8:
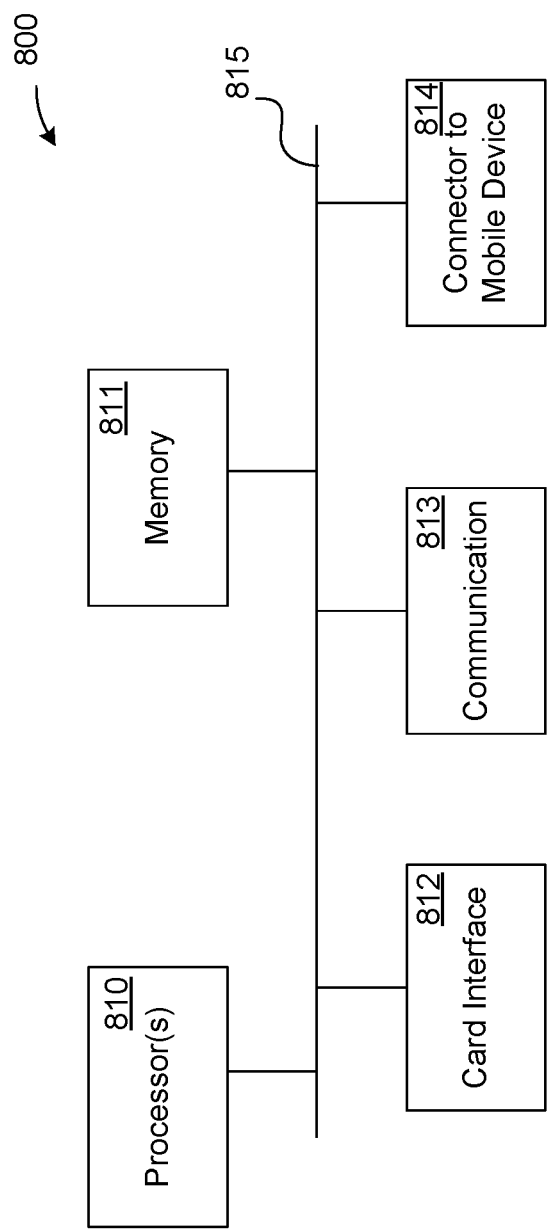
FIG. 8 is a high-level block diagram of a hardware architecture of a card reader.

FIG. 8 illustrates at a high-level an example of the hardware architecture of the card reader 1. In the illustrated embodiment, the architecture 800 includes one or more processors 810, memory 811, a card interface 812, communication device 813, and a connector 814, all coupled to each other through an interconnect 815. The interconnect 815 may be or include one or more conductive traces, buses, point-to-point connections, controllers, adapters and/or other conventional connection devices. The processor(s) 810 may be or include, for example, one or more general-purpose programmable microprocessors, microcontrollers, application specific integrated circuits (ASICs), programmable gate arrays, or the like, or a combination of such devices. The processor(s) 810 control the overall operation of the processing device 800.

Memory 811 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 811 may store data and instructions that configure the processor(s) 810 to execute operations in accordance with the techniques described above.

The card interface 812 is a mechanism for reading data from a payment card and may be, for example, a magnetic stripe reader, smartcard IC chip reader, optical code reader, radio frequency identification (RFID) tag reader, or other similar device. The connector 814 is for connecting the card reader 1 to the mobile device and can be, for example, a standard audio plug, micro-USB connector, or any other known or convenient type of connector.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed:

1. A system comprising:
   a mobile device that includes one or more first processors;
   a card reader coupled to the mobile device; and
   a computer system that includes one or more second processors configured by first executable instructions to cause the computer system to perform first operations that include:
      detecting an initiation of a card reader session between the mobile device and the card reader coupled to the mobile device;
      in response to detecting the initiation, receiving, by the computer system, via a network, and from a software module executable on the mobile device:
         first security information associated with the card reader based on information previously stored in the card reader, and
         second security information based at least in part on content of at least one of the software module or a software environment of the software module;
      determining, by the computer system, that the first security information associated with the card reader is valid based at least on the information previously stored in the card reader and also stored at or made accessible to the computer system;
      determining, by the computer system, that the second security information is valid;
      based on determining that the first security information and the second security information are valid, sending, by the computer system, to the mobile device, a success message indicating that the computer system has validated the first security information of the card reader and the second security information of the software module; and
   wherein the one or more first processors are configured by second executable instructions to cause the mobile device to perform second operations comprising:
      receiving the success message; and
      in response to receiving the success message, establishing a secure communication session between the mobile device and the card reader.

2. The system as recited in claim 1, wherein:
   the first security information associated with the card reader comprises a digital signature of the card reader that is based on digital signature information previously stored on the card reader; and
   corresponding digital signature information for the card reader is previously stored at or made accessible to the computer system.

3. The system as recited in claim 1, wherein the second security information is derived by at least one of the software module or another software module executable on the mobile device, and is derived from at least one of:
   the software module on the mobile device; or the software environment of the software module on the mobile device.

4. The system as recited in claim 1, wherein the first operation of determining, by the computer system, that the second security information is valid comprises:
comparing, by the computer system, the second security information with previously received security information corresponding to the software module, the previously received security information having been received from at least one of:
a provider of the software module; or
a plurality of other mobile devices executing the software module.

5. The system as recited in claim 1, wherein the first operation of determining, by the computer system, that the second security information comprises checking the second security information for an indication of one or more of:
a jailbreaking of the mobile device;
an operation of a debugger on the mobile device;
a presence of unauthorized software on the mobile device; or
an unauthorized modification of the software module.

6. The system as recited in claim 1, wherein the first operation of sending, by the computer system, to the mobile device, the success message comprises:
signing, by the computer system, with a digital signature of the computer system, a cryptographic key associated with the software module; and
sending the digitally signed cryptographic key to the mobile device.

7. A method comprising:
detecting an initiation of a card reader session between a mobile device and a card reader coupled to the mobile device;
in response to detecting the initiation, receiving, by a computer system, via a network, and from a software module executable on the mobile device:
first security information associated with the card reader based on information previously stored in the card reader, and
second security information based at least in part on content of at least one of the software module or a software environment of the software module;
determining, by the computer system, at least one of:
the first security information associated with the card reader is invalid based at least on the information previously stored in the card reader and also stored at or made accessible to the computer system; or
the second security information is invalid;
based on determining that at least one of the first security information or the second security information are invalid, sending, by the computer system, to the mobile device, a failure message indicating that the computer system has determined that the first security information of the card reader or the second security information of the software module are invalid, wherein the failure message precludes the software module and the card reader from establishing the card reader session with each other;
receiving, at the mobile device, the failure message; and
in response to receiving the failure message, preventing, by the mobile device, the card reader session with the card reader from being established.

8. The method as recited in claim 7, wherein:
the first security information associated with the card reader comprises a digital signature of the card reader that is based on digital signature information previously stored on the card reader; and
corresponding digital signature information for the card reader is previously stored at or made accessible to the computer system.

9. The method as recited in claim 7, wherein the second security information comprises at least one of a checksum, a cyclic redundancy check, a sampling, or a hash of at least a portion of at least one of:
the software module on the mobile device; or
the software environment of the software module on the mobile device.

10. The method as recited in claim 7, wherein determining, by the computer system, the second security information is invalid comprises:
comparing, by the computer system, the second security information with previously received security information corresponding to the software module, the previously received security information having been received from at least one of:
a provider of the software module; or
a plurality of other mobile devices executing the software module.

11. The method as recited in claim 7, wherein determining, by the computer system, the second security information is invalid comprises checking the second security information for an indication of one or more of:
a jailbreaking of the mobile device;
an operation of a debugger on the mobile device;
a presence of unauthorized software on the mobile device; or
an unauthorized modification of the software module.

12. One or more non-transitory computer-readable media storing instructions executable by one or more processors of a computer system to configure the computer system to perform first operations comprising:
detecting an initiation of a card reader session between a mobile device and a card reader coupled to the mobile device;
in response to detecting the initiation, receiving, by the computer system, via a network, and from a software module executable on the mobile device:
first security information associated with the card reader based on information previously stored in the card reader, and
second security information based at least in part on content of at least one of the software module or a software environment of the software module;
determining, by the computer system, that the first security information associated with the card reader is valid based at least on the information previously stored in the card reader and also stored at or made accessible to the computer system;
determining, by the computer system, that the second security information is valid;
based on determining that the first security information and the second security information are valid, sending, by the computer system, to the mobile device, a success message indicating that the computer system has validated the first security information of the card reader and the second security information of the software module; and
the one or more non-transitory computer-readable media storing instructions executable by one or more second processors of the mobile device to configure the mobile device to perform second operations comprising:
receiving the success message; and in response to receiving the success message, establishing a secure communication session between the mobile device and the card reader.

13. The one or more non-transitory computer-readable media as recited in claim 12, wherein:
the first security information associated with the card reader comprises a digital signature of the card reader that is based on digital signature information previously stored on the card reader; and
corresponding digital signature information for the card reader is previously stored at or made accessible to the computer system.

14. The one or more non-transitory computer-readable media as recited in claim 12, wherein the second security information comprises at least one of a checksum, a cyclic redundancy check, a sampling, or a hash of at least a portion of at least one of:
the software module on the mobile device; or
the software environment of the software module on the mobile device.

15. The one or more non-transitory computer-readable media as recited in claim 12, wherein the first operation of determining, by the computer system, the second security information is valid comprises:
comparing, by the computer system, the second security information with previously received security information corresponding to the software module, the previously received security information having been received from at least one of:
a provider of the software module; or
a plurality of other mobile devices executing the software module.

16. The one or more non-transitory computer-readable media as recited in claim 12, wherein the first operation of sending, by the computer system, to the mobile device, the success message comprises:

signing, by the computer system, with a digital signature of the computer system, a cryptographic key associated with the software module; and
sending the digitally signed cryptographic key to the mobile device.

17. The system as recited in claim 1, wherein the first operation of determining that the second security information is valid is a precondition for the second operation of establishing the secure communication session between the mobile device and the card reader.

18. The system as recited in claim 1, wherein the second security information associated with the software module comprises:
a public key generated by the software module and digitally signed or authenticated by the software module; and
additional security data that includes a fingerprint of the software module, wherein determining that the second security information is valid includes comparing the fingerprint to a stored fingerprint previously generated for the software module.

19. The method as recited in claim 7, further comprising, in response to determining that the first security information is invalid, maintaining an indication of the determination of invalidity of the first security information on the computer system to use in validation of the card reader in one or more subsequent initiations of card reader sessions with the card reader.

20. The one or more non-transitory computer-readable media as recited in claim 12, wherein the first operation of determining that the second security information is valid is a precondition for the second operation of establishing the secure communication session between the mobile device and the card reader.

* * * * *